(12) United States Patent
Adsule (10) Patent No.: US 10,164,981 B2
(45) Date of Patent: Dec. 25, 2018

(54) METHOD AND SYSTEM FOR CONTROLLING ONLINE USER ACCOUNT USING A MOBILE DEVICE

(71) Applicant: EXCALIBUR IP, LLC, New York, NY (US)

(72) Inventor: Dharmendra Prakash Adsule, Navi Mumbai (IN)

(73) Assignee: EXCALIBUR IP, LLC, New York, NY (US)

( * ) Notice: Subject to any disclaimer, the term of this patent is extended or adjusted under 35 U.S.C. 154(b) by 0 days.

(21) Appl. No.: 15/626,277

(22) Filed: Jun. 19, 2017

(65) Prior Publication Data

US 2017/0289163 A1   Oct. 5, 2017

Related U.S. Application Data (63) Continuation of application No. 14/038,785, filed on Sep. 27, 2013, now Pat. No. 9,686,271.

(51) Int. Cl.
*H04L 29/06* (2006.01)
*H04L 12/58* (2006.01)
*G06F 21/35* (2013.01)

(52) U.S. Cl.
CPC .............. *H04L 63/10* (2013.01); *G06F 21/35* (2013.01); *H04L 51/12* (2013.01); *H04L 63/08* (2013.01); *H04L 63/083* (2013.01); *H04L 63/1416* (2013.01); *G06F 2221/2131* (2013.01); *H04L 63/0853* (2013.01); *H04L 63/1466* (2013.01); *H04L 63/18* (2013.01)

(58) Field of Classification Search
None
See application file for complete search history.

(56) References Cited

U.S. PATENT DOCUMENTS

| | | | |
|---|---|---|---|
| 8,302,187 B1 * | 10/2012 | Gupta | H04L 65/1079 713/182 |
| 9,317,672 B2 * | 4/2016 | Carlson | G06F 21/31 |
| 2006/0052091 A1 * | 3/2006 | Onyon | H04L 29/12047 455/415 |
| 2006/0094403 A1 * | 5/2006 | Norefors | G06F 21/35 455/411 |

(Continued)

*Primary Examiner* — William J. Goodchild
(74) *Attorney, Agent, or Firm* — James J. DeCarlo; Greenberg Traurig, LLP (57) ABSTRACT

A method and system for controlling online user account using a mobile device. The method includes receiving an option to lock an online account of a user from a service provider. The computer-implemented method also includes locking the online user account by using a mobile device. Further, the computer-implemented method includes initiating a user action at a later point of time. Furthermore, the computer-implemented method includes receiving an alert to unlock the online user account in order to perform the user action and obtaining an unlock password from the service provider. Moreover, the computer-implemented method includes unlocking the online user account with the unlock password by using the mobile device and performing the user action subsequent to the unlocking, thereby controlling the online user account using the mobile device. The system includes a computing device, a web browser, a service provider and a mobile device.

20 Claims, 5 Drawing Sheets

(56) References Cited

U.S. PATENT DOCUMENTS

| | | | |
|---|---|---|---|
| 2008/0098464 A1* | 4/2008 | Mizrah | G06F 21/36 726/5 |
| 2009/0187980 A1* | 7/2009 | Tung | H04L 63/0823 726/6 |
| 2010/0257097 A1* | 10/2010 | Saban | G06Q 20/04 705/44 |
| 2011/0113476 A1* | 5/2011 | Moutarazak | G06F 21/34 726/6 |
| 2013/0024923 A1* | 1/2013 | Wallaja | G06Q 20/00 726/6 |
| 2013/0061307 A1* | 3/2013 | Livne | H04W 12/06 726/7 |
| 2013/0160104 A1* | 6/2013 | Carlson | G06F 21/31 726/7 |
| 2013/0298200 A1 | 11/2013 | Cai | |
| 2014/0256425 A1* | 9/2014 | Flaherty | A63F 13/12 463/29 |
| 2014/0324694 A1 | 10/2014 | Fernandes | |

\* cited by examiner

METHOD AND SYSTEM FOR CONTROLLING ONLINE USER ACCOUNT USING A MOBILE DEVICE

CROSS REFERENCE TO RELATED APPLICATION

This application is a continuation of, and claims priority from U.S. patent application Ser. No. 14/038,785, filed Sep. 27, 2013, now U.S. Pat. No. 9,686,271, which is incorporated herein by reference.

TECHNICAL FIELD

Embodiments of the disclosure relate generally, to browsing activities and more specifically, to control online user account using a mobile device.

BACKGROUND

Web browsing activities continue to spread out with services for enormous number of users through a web browser. The web browser allows the users to visit websites to perform various activities. One of the most widespread and essential activity performed by users are to send emails, attach files and receive emails using an online user account. The online user accounts are created by users through mail service providers, for example Yahoo! and Gmail. Since email activities are an important method of both business and personal communication, it is vital to be proactive in securing online user accounts. Generally, online user accounts are hijacked and hacked. Typically, a hacker uses a compromised online user account to impersonate the user and carry out malicious (unauthorized) activities. Consequently, protecting the online user accounts (email security) from hackers turns out to be imperative as well.

There are many ways for protecting the online user accounts. A general way to protect is to have a password. However, email security goes beyond just having a strong password. Another way involves in locking the online user accounts based on heuristics. Locking is initiated by mail service providers and is completely out of the user's control. However, this process has false positives indicating that any normal or expected behaviors on the users accounts are performed by a malicious user, Other methods are just normal approaches that get overlooked. Despite the fact that there are many ways for protecting, preventing the online user accounts from hacking continues to be challenge.

In light of the foregoing discussion, there is a need for an efficient method and system for controlling online account.

SUMMARY

The above-mentioned needs are met by a method, a computer program product and a system for controlling online user account using a mobile device.

An example of a computer-implemented method for controlling online user account using a mobile device includes receiving an option to lock an online account of a user from a service provider. The computer-implemented method also includes locking the online user account by using a mobile device. Further, the computer-implemented method includes initiating a user action at a later point of time. Furthermore, the computer-implemented method includes receiving an alert to unlock the online user account in order to perform the user action and obtaining an unlock password from the service provider. Moreover, the computer-implemented method includes unlocking the online user account with the unlock password by using the mobile device and performing the user action subsequent to the unlocking, thereby controlling the online user account using the mobile device.

An example of a computer program product stored on a non-transitory computer-readable medium that when executed by a processor, performs a method for controlling an online user account includes receiving an option to lock an online account of a user from a service provider. The computer program product includes locking the online user account by using a mobile device. Further, the computer program product also includes initiating a user action at a later point of time. Furthermore, the computer program receiving an alert to unlock the online user account in order to perform the user action and obtaining an unlock password from the service provider. Moreover, the computer program product includes unlocking the online user account with the unlock password by using the mobile device and performing the user action subsequent to the unlocking, thereby controlling the online user account using the mobile device.

An example of a system for controlling online user account using a mobile device includes a computing device to perform user actions on an online user account. The system also includes a web browser installed on the computing device to load a plurality of web pages to a user. Further, the system includes a service provider, communicatively coupled to the mobile device. Furthermore, the system includes a mobile device in electronic communication with the service provider, to lock and unlock the online user account thereby controlling the online user account.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

BRIEF DESCRIPTION OF THE FIGURES

In the following drawings like reference numbers are used to refer to like elements. Although the following figures depict various examples of the invention, the invention is not limited to the examples depicted in the figures.

DETAILED DESCRIPTION OF THE EMBODIMENTS

The above-mentioned needs are met by a method, computer program product and system for controlling online user account using a mobile device. The following detailed description is intended to provide example implementations to one of ordinary skill in the art, and is not intended to limit the invention to the explicit disclosure, as one or ordinary skill in the art will understand that variations can be substituted that are within the scope of the invention as described.

The user creates an online user account, for example frank_t802@yahoo.com, using a desired service provider. The user becomes an owner of the online user account. The service provider is herein referred to as a mail service provider. A service provider is an organization that offers users to access the Internet and related online services. Examples of the mail service provider include, but are not limited to, Gmail, Yahoo! Mail and Hotmail.

Figure 1:
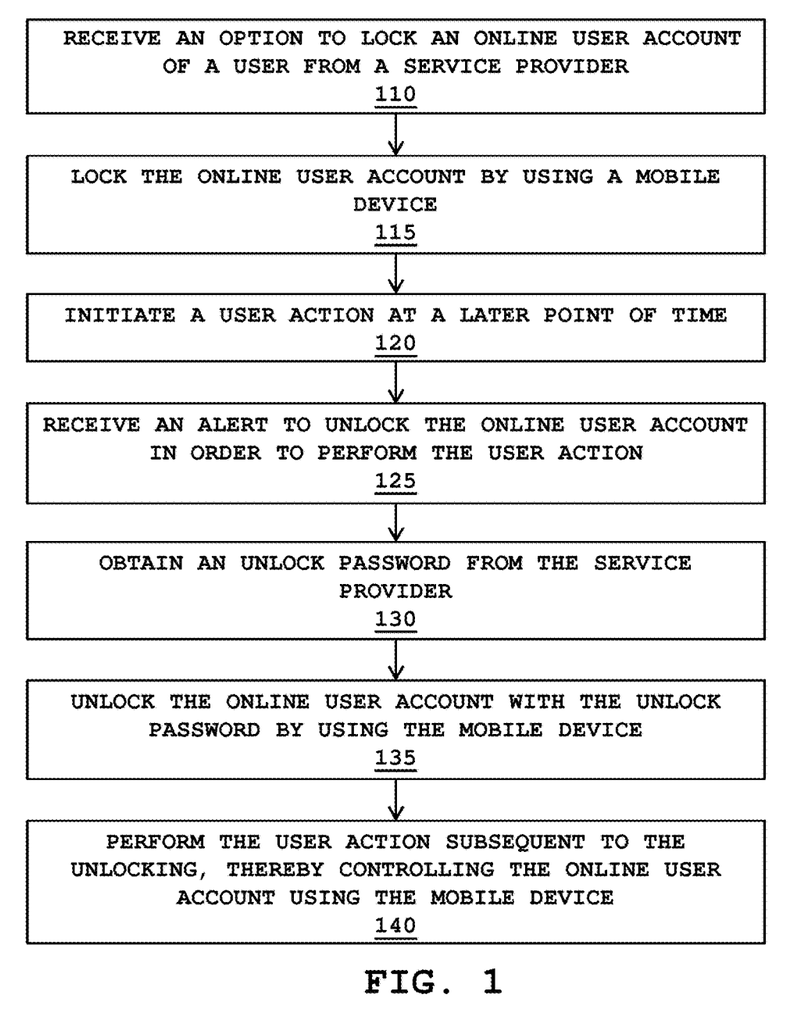
FIG. 1 is a flow diagram illustrating a method for controlling online user account using a mobile device, in accordance with one embodiment.

FIG. 1 is a flow diagram illustrating a method for controlling user online account using a mobile device, in accordance with one embodiment.

At step 110, an option is received to lock an online user account of a user from a service provider.

At the time of creating the online user account, the user registers his mobile device number with the service provider. At this point of time, the service provider sends the option to lock the online user account. Consequently, the user receives the option on his mobile device. Locking ensures that the online user account is secured from malicious users.

At step 115, the user locks the online user account by using his mobile device. Further, the lock is set by using the service provider's website. Alternatively, the user locks the online user account by sending a Short Message Service (SMS), for example, "LOCK 54321", from the mobile device to the service provider's number.

The user wishes to lock the online user account to prevent malicious users from performing actions on the online user account. Occasionally, the user might be inactive on the online user account for a certain period of time. In such scenarios, the user may want to lock his online user account that a malicious user does not perform any actions.

Locking the online user account prevents any user action to be performed until the online user account is unlocked using the mobile device. Further, false positives are reduced. However, the user can continue utilizing an online service subsequent to locking the online user account. Examples of the online service include, but are not limited to, message boards, chat services, electronic mails and online games. Further, a malicious user can utilize only passive online services after hacking the users account. Examples of passive online services includes, but is not limited to, reading news, browsing through pictures, searching message boards and playing games.

At step 120, a user action is initiated at a later point of time.

A number of widespread activities can be performed on the online user accounts. The activities are herein referred to as user actions. Examples of user actions include, but are not limited to, sending an email, changing user password, changing user profile information (such as date of birth, secret question and so on), updating account preferences and updating alternate emails.

At step 125, an alert is received to unlock the online user account in order to perform the user action. The service provider identifies occurrence of the user action to be performed and initiates an alert. At this instance, the user receives the alert on the mobile device. The alert notifies the user to unlock the online user account to perform the user action. The alert can be a SMS from the service provider. In some embodiments, the alert can be a notification.

At step 130, an unlock password is obtained from the service provider.

Following the alert, the service provider sends the unlock password (UP) to the user's mobile device. The unlock password is a secret unspaced sequence of characters given to the user. Moreover, the unlock password is unique for each mobile device registered with the service provider.

At step 135, the online user account is unlocked with the unlock password by using the mobile device. The user keys in the unlock password to gain access to the online user account. In some embodiments, the user may use the unlock password to log into the online user account.

For the reason that the locking and unlocking is performed using the mobile device, the user has complete control over the online user account.

In some embodiments, the user signs into the online user account again to perform an action. At this instance, the user authorizes using the mobile device to unlock the online user account.

In some embodiments, the user can contact the service provider and follow any process to unlock the online user account.

Assume a scenario where the user locks the online user account and later misplaces his mobile device. At this moment, the user requests the service provider to block the current SIM (Subscriber Identity Module) card and provide a new SIM card. Once the new SIM card activates, the user can login to the online user account and initiate a user action. Consequently, a new "unlock password" is sent to the user automatically. Consider another scenario where the user's mobile device has been stolen. It is apparent that a malicious user uses the stolen mobile device to unlock the online user account. However, the "unlock password" is valid only for a certain period of time and hence cannot be misused.

At step 140, the user action is performed subsequent to the unlocking, thereby controlling the online user account using the mobile device.

Only after unlocking the online user account, the user action is allowed to be performed. As a result, it becomes evident that the user action is initiated by the owner of the online user account.

The online user account is completely controlled by the user using the mobile device. The mobile device operates in an off-network environment.

Figure 2:
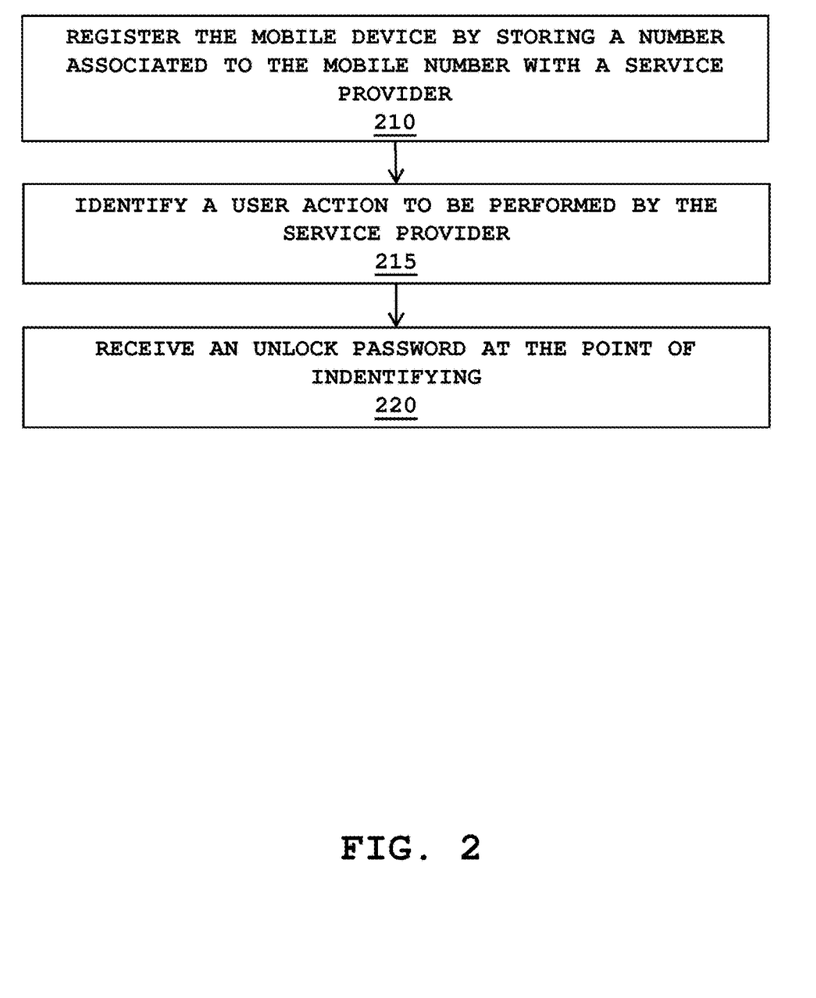
FIG. 2 is a flow diagram illustrating a method for off-network authorization using a mobile device, in accordance with one embodiment.

FIG. 2 is a flow diagram illustrating a method for off-network authorization using a mobile device, in accordance with one embodiment.

Consider that a user has an online user account and owns a mobile device.

At step 210, the mobile device is registered by storing a number associated to the mobile device with a service provider.

Subsequently, the user locks the online user account, for instance as described above in connection with the process of FIG. 1.

At step 215, a user action to be performed is identified by the service provider. Typically, the user initiates the user action on a computing device. The user action stimulates the service provider to send an alert on the mobile device. Moreover, the alert notifies the user that a user action has been initiated on his online user account. The alert is a trigger, for example a SMS, on the mobile device. (At this point, assuming that the user has actually not initiated the user action, the alert on the user's mobile device clearly discriminates that a malicious user is hacking the online user account.)

At step 220, an unlock password is received at the at the point of identifying. The unlock password is generated, for instance, by the service provider, as described in connection with element 130 of FIG. 1.

The service provider requests the user to unlock the online user account in order to perform the user action. Consequently, the unlock password is sent to the user's mobile device. This process is termed as off-network authorization. By contrast, an on-network authorization provides access to a user through the network.

Figure 3:
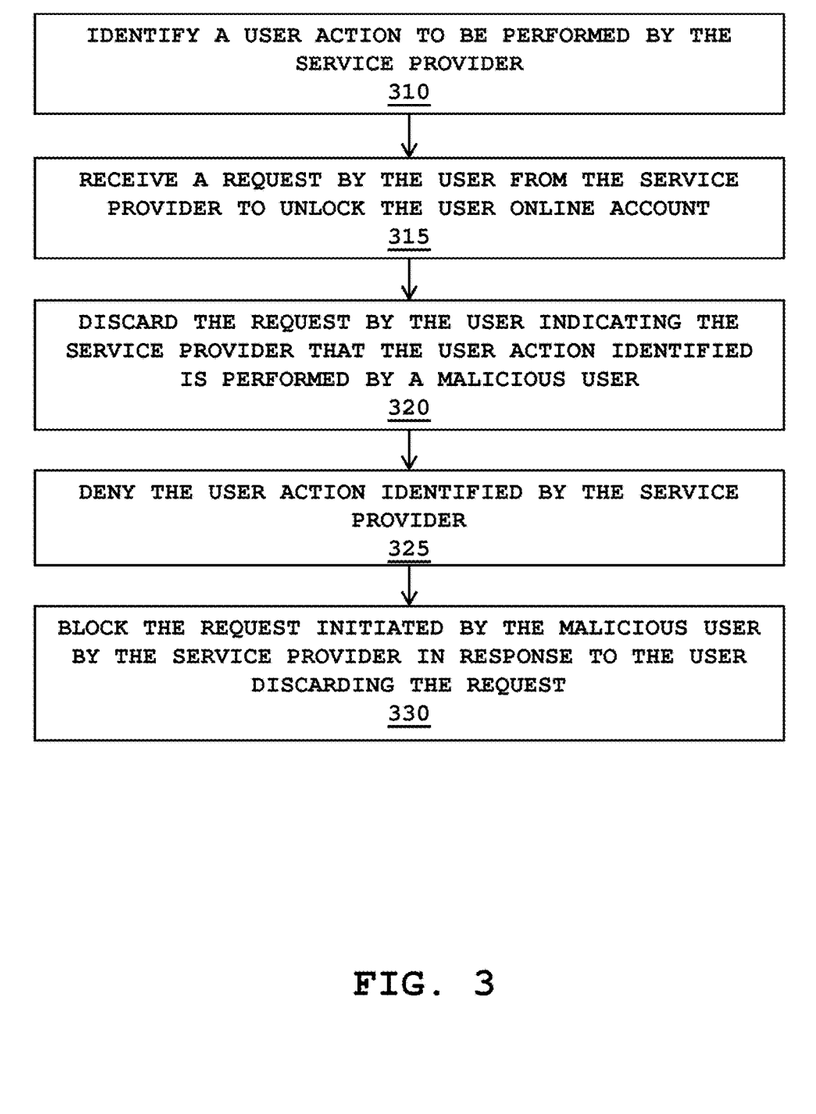
FIG. 3 is a flow diagram illustrating a method for identifying a malicious user, in accordance with one embodiment.

FIG. 3 is a flow diagram illustrating a method for identifying a malicious user, in accordance with one embodiment.

At step 310, a user action to be performed is identified by the service provider. The identification takes place in response to a user attempting to perform the user action. The user action might take place normally, or might be inhibited due to locking, as described above with reference to Step 220 of FIG. 2. Note also, that the user action that is identified may have been attempted, not by the user himself, but rather by a malicious user who has found or stolen a mobile appliance or who has gained surreptitious access to the user's mobile device.

At step 315, a request is received by the user from the service provider to unlock the user online account, again as per the discussion above.

At step 320, the request is discarded by the user indicating the service provider that the user action identified is performed by a malicious user.

In such a scenario, a malicious user has actually initiated the user action. The service provider assumes that the user action has been initiated by the user himself and requests the user to unlock the online user account. However, the user is aware that the user action has not been initiated by himself and hence overlooks the request. For example, the user may be engaged in a social gathering when he receives an option to unlock his online user account on his mobile device. It is evident that the user has not initiated the user action, and hence discards the request indicating that a malicious user is trying to perform the user action. As a result, the service provider confirms the malicious user and takes necessary actions to prevent hacking.

In some embodiments, a time period, for example ten minutes, may be set by the service provider when the request is sent to the user. If the user fails to respond to the request within the stipulated time period, the service provider concludes that the user action is being performed by a malicious user.

Assume that the user has entered an incorrect unlock password. At this instance, the service provider sends an option to the users mobile device to provide a new password.

At step 325, the service provider denies the user action identified.

The following scenarios illustrate how the user is assured that the online user account is safe from being hacked.

Scenario 1: A malicious user gets access to a user's cookies. The malicious user performs an action by logging into the online user account, and tries to reset password set by the user. However, the action fails as off-network authorization is required from the user.

Scenario 2: A malicious user has got either one of a user's login and a user's password. The malicious user logs into the online user account and tries to reset password set by the user. However, the action fails as off-network authorization is required from the user.

Scenario 3: A malicious user sends a malicious link to a user. When the user clicks on the link, a user action for example, "delete user account" and "make a credit card transaction", is performed. However, when the user clicks on the link, the user action fails as off-network authorization is still waiting from the user to unlock the online user account.

Scenario 4: A malicious user embeds an image tag in the users email. The image tag points to a malicious user script running on a fraudulent server. However, when the user opens the email, transaction would fail as off-network authorization is required.

Scenario 5: A user email account is compromised and a malicious user tries to use the email account to send spam. Currently, the user uses the email account to casually read emails without unlocking the account. However, in this scenario, the emails would be automatically blocked by the service provider hence reducing the frequency of spam emails.

At step 330, the request initiated by the malicious user is blocked automatically by the service provider in response to the user discarding the request.

Figure 4:
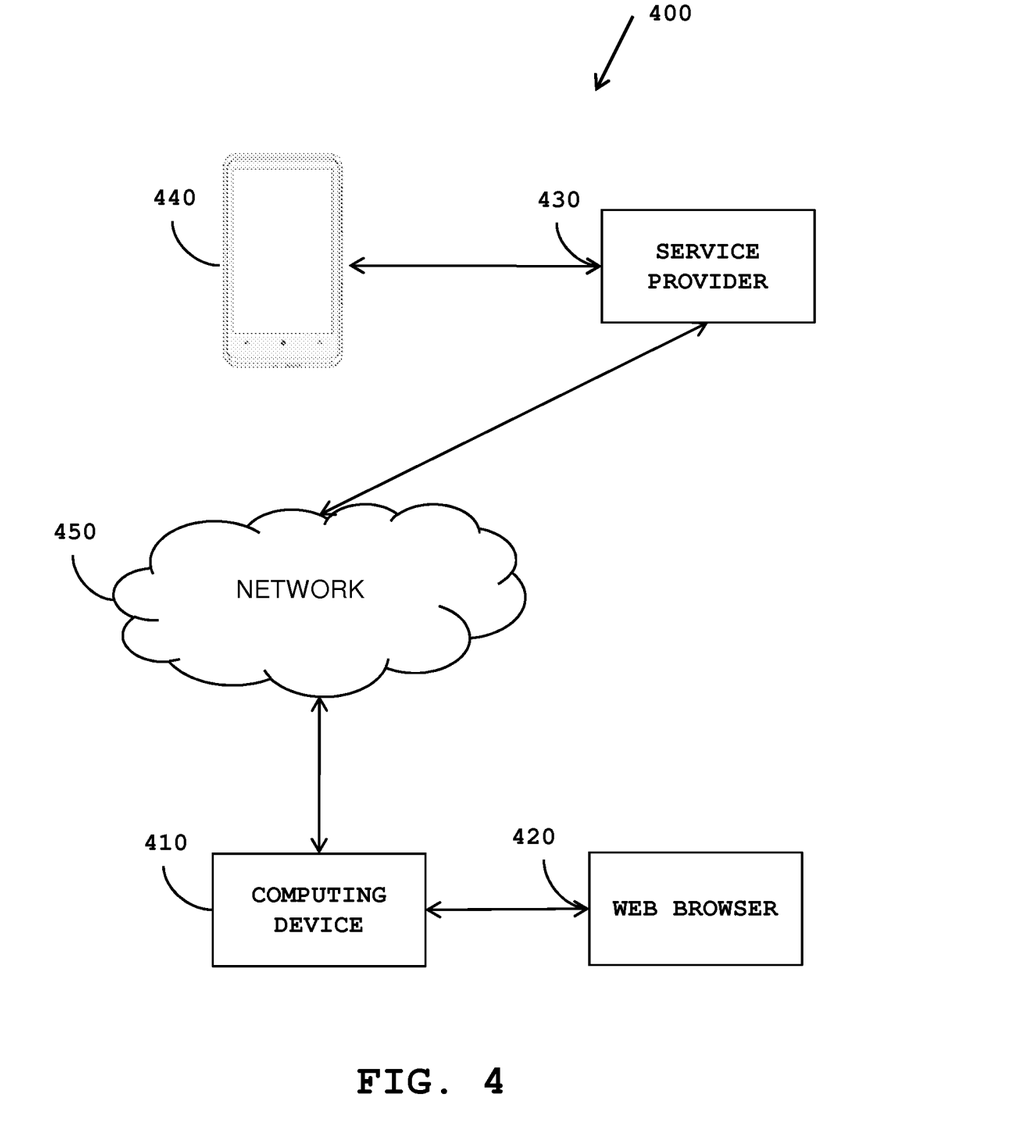
FIG. 4 is a block diagram illustrating a system for controlling online user account using a mobile device, in accordance with one embodiment.

FIG. 4 is a block diagram illustrating a system for controlling online user account using a mobile device, in accordance with one embodiment.

The system 400 can implement the method described above. The system 400 includes a computing device 410, a web browser 420, a service provider 430, and a mobile device 440 in communication with a network 450 (for example, the Internet or a cellular network).

Examples of the computing device 410 include, but are not limited to, a Personal Computer (PC), a laptop or notebook computer, a tablet computer, a smart phone or Personal Digital Assistant (PDA), a smart appliance, an Internet television or any other suitable processor-based device that can display web pages.

The computing device 410 includes a web browser 420. The web browser is a software application for retrieving, presenting and traversing information resources on the World Wide Web (WWW). The information resources are web pages, images, videos or other forms of content. The web browser can be a desktop web browser (for example, Internet Explorer, Mozilla, or Chrome), a mobile browser, or a web viewer built integrated into an application program.

The web browser 420 loads desired web pages for the user. The web pages can include textual information, digital images, video and static advertisements, and other digital assets.

The service provider 430, for example Yahoo! and Gmail, provides email services to users of the computing device 410 through the network 450. The email services enable users to send, receive and review email from corresponding web browsers. Examples of email services include, but are not limited to, Yahoo! Mail, Gmail, Hotmail and AOL Mail.

The mobile device 440 is a wireless electronic device associated with a unique number. The mobile device 440 is connected to the service provider 430. The mobile device 440 is used to lock and unlock a user online account.

The user of the computing device 410 opens the web browser 420 and creates an online user account, for example richard_m5n@gmail.com, using the service provider 430. Further, the user utilizes the mobile device 440 and stores a corresponding number with the service provider 430 for authorization. Following the authorization, the user receives an option to lock the online user account on the mobile device 440. The option to lock is sent from the service provider 430. Consequently, the online user account is locked.

The user signs into the online user account and initiates a user action. At this instance, the service provider 430 identifies the user action and alerts the user on the mobile device 440. The alert notifies the user to unlock the online user account in order to perform the user action. Consequently, the user receives an unlock password (UP) on the mobile device 440. The user unlocks the online user account with the unlock password thereby controlling the online user account using the mobile device 440. Soon after unlocking, the user action is performed.

Figure 5:
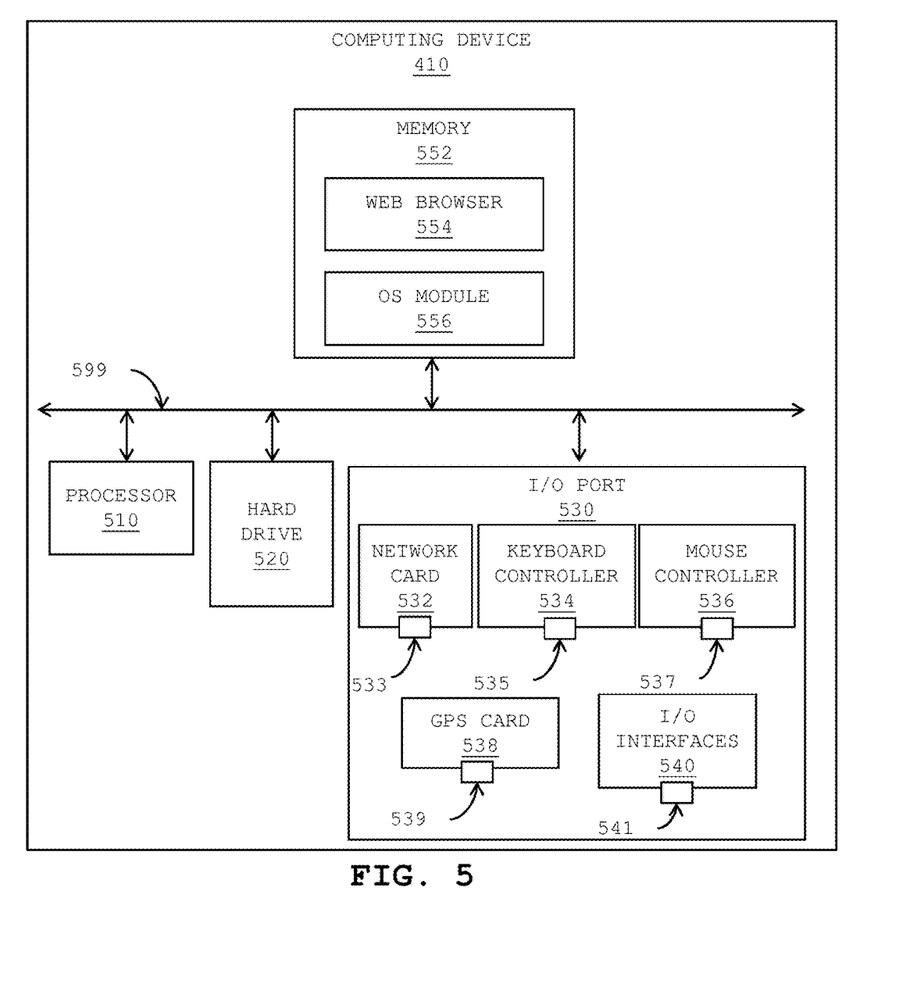
FIG. 5 is a block diagram illustrating an exemplary computing device, in accordance with one embodiment.

Additional embodiments of the computing device 410 are described in detail in conjunction with FIG. 5.

FIG. 5 is a block diagram illustrating an exemplary computing device, for example the computing device 410 in accordance with one embodiment. The computing device 410 includes a processor 510, a hard drive 520, an I/O port 530, and a memory 552, coupled by a bus 599.

The bus 599 can be soldered to one or more motherboards. Examples of the processor 510 includes, but is not limited to, a general purpose processor, an application-specific integrated circuit (ASIC), an FPGA (Field Programmable Gate Array), a RISC (Reduced Instruction Set Controller) processor, or an integrated circuit. The processor 510 can be a single core or a multiple core processor. In one embodiment, the processor 510 is specially suited for processing demands of location-aware reminders (for example, custom micro-code, and instruction fetching, pipelining or cache sizes). The processor 510 can be disposed on silicon or any other suitable material. In operation, the processor 510 can receive and execute instructions and data stored in the memory 552 or the hard drive 520. The hard drive 520 can be a platter-based storage device, a flash drive, an external drive, a persistent memory device, or other types of memory.

The hard drive 520 provides persistent (long term) storage for instructions and data. The I/O port 530 is an input/output panel including a network card 532 with an interface 533 along with a keyboard controller 534, a mouse controller 536, a GPS card 538 and I/O interfaces 540. The network card 532 can be, for example, a wired networking card (for example, a USB card, or an IEEE 802.3 card), a wireless networking card (for example, an IEEE 802.11 card, or a Bluetooth card), and a cellular networking card (for example, a 3G card). The interface 533 is configured according to networking compatibility. For example, a wired networking card includes a physical port to plug in a cord, and a wireless networking card includes an antennae. The network card 532 provides access to a communication channel on a network. The keyboard controller 534 can be coupled to a physical port 535 (for example PS/2 or USB port) for connecting a keyboard. The keyboard can be a standard alphanumeric keyboard with 101 or 104 keys (including, but not limited to, alphabetic, numerical and punctuation keys, a space bar, modifier keys), a laptop or notebook keyboard, a thumb-sized keyboard, a virtual keyboard, or the like. The mouse controller 536 can also be coupled to a physical port 537 (for example, mouse or USB port). The GPS card 538 provides communication to GPS satellites operating in space to receive location data. An antenna 539 provides radio communications (or alternatively, a data port can receive location information from a peripheral device). The I/O interfaces 540 are web interfaces and are coupled to a physical port 541.

The memory 552 can be a RAM (Random Access Memory), a flash memory, a non-persistent memory device, or other devices capable of storing program instructions being executed. The memory 552 comprises an Operating System (OS) module 556 along with a web browser 554. In other embodiments, the memory 552 comprises a calendar application that manages a plurality of appointments. The OS module 556 can be one of Microsoft Windows® family of operating systems (for example, Windows 95, 98, Me, Windows NT, Windows 2000, Windows XP, Windows XP x64 Edition, Windows Vista, Windows CE, Windows Mobile), Linux, HP-UX, UNIX, Sun OS, Solaris, Mac OS X, Alpha OS, AIX, IRIX32, or IRIX64.

The web browser 554 can be a desktop web browser (for example, Internet Explorer, Mozilla, or Chrome), a mobile browser, or a web viewer built integrated into an application program. In an embodiment, a user accesses a system on the World Wide Web (WWW) through a network such as the Internet. The web browser 554 is used to download the web pages or other content in various formats including HTML, XML, text, PDF, postscript, python and PHP and may be used to upload information to other parts of the system. The web browser may use URLs (Uniform Resource Locators) to identify resources on the web and HTTP (Hypertext Transfer Protocol) in transferring files to the web.

As described herein, computer software products can be written in any of various suitable programming languages, such as C, C++, C#, Pascal, Fortran, Perl, Matlab (from MathWorks), SAS, SPSS, JavaScript, AJAX, and Java. The computer software product can be an independent application with data input and data display modules. Alternatively, the computer software products can be classes that can be instantiated as distributed objects. The computer software products can also be component software, for example Java Beans (from Sun Microsystems) or Enterprise Java Beans (EJB from Sun Microsystems). Much functionality described herein can be implemented in computer software, computer hardware, or a combination.

Furthermore, a computer that is running the previously mentioned computer software can be connected to a network and can interface to other computers using the network. The network can be an intranet, internet, or the Internet, among others. The network can be a wired network (for example, using copper), telephone network, packet network, an optical network (for example, using optical fiber), or a wireless network, or a combination of such networks. For example, data and other information can be passed between the computer and components (or steps) of a system using a wireless network based on a protocol, for example Wi-Fi (IEEE standards 802.11, 802.11a, 802.11b, 802.11e, 802.11g, 802.11i, and 1802.11n). In one example, signals from the computer can be transferred, at least in part, wirelessly to components or other computers.

Advantageously, as the user controls the online user account, the method minimizes misuse of hacked accounts. Typically, malicious users hijack the online user account by getting access to user's cookies. A cookie is a small file of letters and numbers downloaded on to the user's computer when the user accesses certain websites. The websites transfers the file from the browser to the hard disk of the computer so that the websites can remember the user. Here, the service provider erroneously assumes that a genuine user is performing the user action. However, since an explicit authentication is provided with an off-network query with the user, such hijacks fail. Further, heuristic guessing whether a user online account has been compromised or not is minimized as the user has control on the online user account. Malicious users are not given access to the online user account until the online user account is unlocked. Apparently, the online user account can be unlocked only by the user through his mobile device thereby reducing malicious access. Moreover, traditional web applications that grant all privileges to a user once the signs in surpassed.

It is to be understood that although various components are illustrated herein as separate entities, each illustrated component represents a collection of functionalities which can be implemented as software, hardware, firmware or any combination of these. Where a component is implemented as software, it can be implemented as a standalone program, but can also be implemented in other ways, for example as part of a larger program, as a plurality of separate programs, as a kernel loadable module, as one or more device drivers or as one or more statically or dynamically linked libraries.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies and other aspects are not mandatory or significant, and the mechanisms that implement the invention or its features may have different names, divisions and/or formats.

Furthermore, as will be apparent to one of ordinary skill in the relevant art, the portions, modules, agents, managers, components, functions, procedures, actions, layers, features, attributes, methodologies and other aspects of the invention can be implemented as software, hardware, firmware or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment.

Furthermore, it will be readily apparent to those of ordinary skill in the relevant art that where the present invention is implemented in whole or in part in software, the software components thereof can be stored on computer readable media as computer program products. Any form of computer readable medium can be used in this context, such as magnetic or optical storage media. Additionally, software portions of the present invention can be instantiated (for example as object code or executable images) within the memory of any programmable computing device.

Accordingly, the disclosure of the present invention is intended to be illustrative, but not limiting, of the scope of the invention, which is set forth in the following claims.

What is claimed is:

1. A method comprising:
   receiving, at a computing device associated with a service provider, from a user device over a network, information associated with an action requested to be performed on said user device in association with an account provided by the service provider;
   in response to receiving the action information, automatically communicating, via the computing device, a request to said user device, said request comprising a message providing said user device functionality to authenticate said requested action;
   receiving, at said computing device from said user device, data indicating a response to said request, said response data providing an indication of activity performed by a user of said user device upon viewing said request;
   analyzing, via the computing device, said response data, said analysis comprising determining whether said response data represents activity that is performed by an account holder of said account or by a malicious user; and
   communicating, via the computing device over the network, an instruction to lock said user device upon said analysis resulting in a determination said requested action was generated by said malicious user, said communication causing said user device to block access to programs installed on said user device while locked.

2. The method of claim 1, further comprising:
   locking, over the network, the account upon said analysis resulting in a determination said requested action was generated by said malicious user, said locking comprising communicating a message to said user device preventing any user action to be performed from said account while locked.

3. The method of claim 1, further comprising:
   denying said requested action, wherein said denying comprising communicating a message to said user device indicating said denial.

4. The method of claim 1, further comprising:
   communicating, over the network, a message to an inbox of said account enabling the account holder to unlock said user device or account.

5. The method of claim 1, wherein said received data provides a further indication regarding a time period for generation of said data, said time period associated with a time said response data is generated after said viewing said request.

6. The method of claim 5, further comprising:
   comparing said time period to a predetermined time threshold; and
   determining whether said response data is associated with malicious activity based on a result of said comparison.

7. The method of claim 1, wherein said activity represented by the response data comprises a login attempt to the account.

8. The method of claim 1, wherein said activity represented by the response data comprises a network activity via a platform provided by said service provider from the account.

9. A non-transitory computer-readable storage medium tangibly encoded with computer-executable instructions, that when executed by a computing device, perform a method comprising:
   receiving, at the computing device associated with a service provider, from a user device over a network, information associated with an action requested to be performed on said user device in association with an account provided by the service provider;
   in response to receiving the action information, automatically communicating, via the computing device, a request to said user device, said request comprising a message providing said user device functionality to authenticate said requested action;
   receiving, at said computing device from said user device, data indicating a response to said request, said response data providing an indication of activity performed by a user of said user device upon viewing said request;

analyzing, via the computing device, said response data, said analysis comprising determining whether said response data represents activity is performed by an account holder of said account or a malicious user; and communicating, via the computing device over the network, an instruction to lock said user device upon said analysis resulting in a determination said requested action was generated by said malicious user, said communication causing said user device to block access to programs installed on said user device while locked.

10. The non-transitory computer-readable storage medium of claim 9, further comprising:

locking, over the network, the account upon said analysis resulting in a determination said requested action was generated by said malicious user, said locking comprising communicating a message to said user device preventing any user action to be performed from said account while locked.

11. The non-transitory computer-readable storage medium of claim 9, further comprising:

denying said requested action, wherein said denying comprising communicating a message to said user device indicating said denial.

12. The non-transitory computer-readable storage medium of claim 9, further comprising:

communicating, over the network, a message to an inbox of said account enabling the account holder to unlock said user device or account.

13. The non-transitory computer-readable storage medium of claim 9, wherein said received data provides a further indication regarding a time period for generation of said data, said time period associated with a time said response data is generated after said viewing said request.

14. The non-transitory computer-readable storage medium of claim 13, further comprising:

comparing said time period to a predetermined time threshold; and determining whether said response data is associated with malicious activity based on a result of said comparison.

15. The non-transitory computer-readable storage medium of claim 9, wherein said activity represented by the response data comprises a login attempt to the account.

16. The non-transitory computer-readable storage medium of claim 9, wherein said activity represented by the response data comprises a network activity via a platform provided by said service provider from the account.

17. A computing device comprising:

a processor;

a non-transitory computer-readable storage medium for tangibly storing thereon program logic for execution by the processor, the program logic comprising:

logic executed by the processor for receiving, at the computing device associated with a service provider, from a user device over a network, information associated with an action requested to be performed on said user device in association with an account provided by the service provider;

logic executed by the processor for automatically communicating, via the computing device in response to receiving the action information, a request to said user device, said request comprising a message providing said user device functionality to authenticate said requested action;

logic executed by the processor for receiving, at said computing device from said user device, data indicating a response to said request, said response data providing an indication of activity performed by a user of said user device upon viewing said request;

logic executed by the processor for analyzing, via the computing device, said response data, said analysis comprising determining whether said response data represents activity is performed by an account holder of said account or a malicious user; and logic executed by the processor for communicating, via the computing device over the network, an instruction to lock said user device upon said analysis resulting in a determination said requested action was generated by said malicious user, said communication causing said user device to block access to programs installed on said user device while locked.

18. The computing device of claim 17, further comprising:

logic executed by the processor for locking, over the network, the account upon said analysis resulting in a determination said requested action was generated by said malicious user, said locking comprising communicating a message to said user device preventing any user action to be performed from said account while locked.

19. The computing device of claim 17, further comprising:

logic executed by the processor for denying said requested action, wherein said denying comprising communicating a message to said user device indicating said denial.

20. computing device of claim 17, further comprising:

logic executed by the processor for communicating, over the network, a message to an inbox of said account enabling the account holder to unlock said user device or account.

* * * * *